(12) United States Patent
Zhu

(10) Patent No.: US 11,623,662 B2
(45) Date of Patent: Apr. 11, 2023

(54) PLANNING SYSTEM FOR SPEED LIMIT CHANGES FOR AUTONOMOUS VEHICLES

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 280 days.

(21) Appl. No.: 16/870,475

(22) Filed: May 8, 2020

(65) Prior Publication Data
US 2021/0347381 A1 Nov. 11, 2021

(51) Int. Cl.
*B60W 60/00* (2020.01)
*B60W 10/04* (2006.01)
*B60W 10/18* (2012.01)

(52) U.S. Cl.
CPC ........ *B60W 60/0016* (2020.02); *B60W 10/04* (2013.01); *B60W 10/18* (2013.01); *B60W 2420/52* (2013.01); *B60W 2520/105* (2013.01); *B60W 2530/18* (2013.01); *B60W 2552/30* (2020.02); *B60W 2555/60* (2020.02)

(58) Field of Classification Search
CPC .. B60W 60/0016; B60W 10/04; B60W 10/18; B60W 2420/52; B60W 2520/105; B60W 2530/18; B60W 2552/30; B60W 2555/60; B60W 30/146; B60W 10/06; B60W 2520/10; B60W 2552/05; B60W 2555/20; B60W 2710/0605; B60W 2710/18; B60W 2720/10
See application file for complete search history.

(56) References Cited

U.S. PATENT DOCUMENTS

2020/0385024 A1* 12/2020 Wongpiromsarn .......... B60W 60/0013

* cited by examiner

*Primary Examiner* — Alan D Hutchinson
(74) *Attorney, Agent, or Firm* — Womble Bond Dickinson (US) LLP

(57) ABSTRACT

In one embodiment, a speed planning system receives speed limit information for an autonomous driving vehicle (ADV), where the speed limit information includes a change in road speed limit for a current road of the ADV. The system determines a tapered speed limit corresponding to the current road based on the speed limit information, where the tapered speed limit correspond to a gradual speed reduction from a first road speed limit to a second road speed limit. The system determines a cost function based on the tapered speed limit and the first and second road speed limits. The system generates a number of trajectory candidates based on the cost function. The system selects a trajectory based on the trajectory candidates to control the ADV using the selected trajectory.

20 Claims, 15 Drawing Sheets

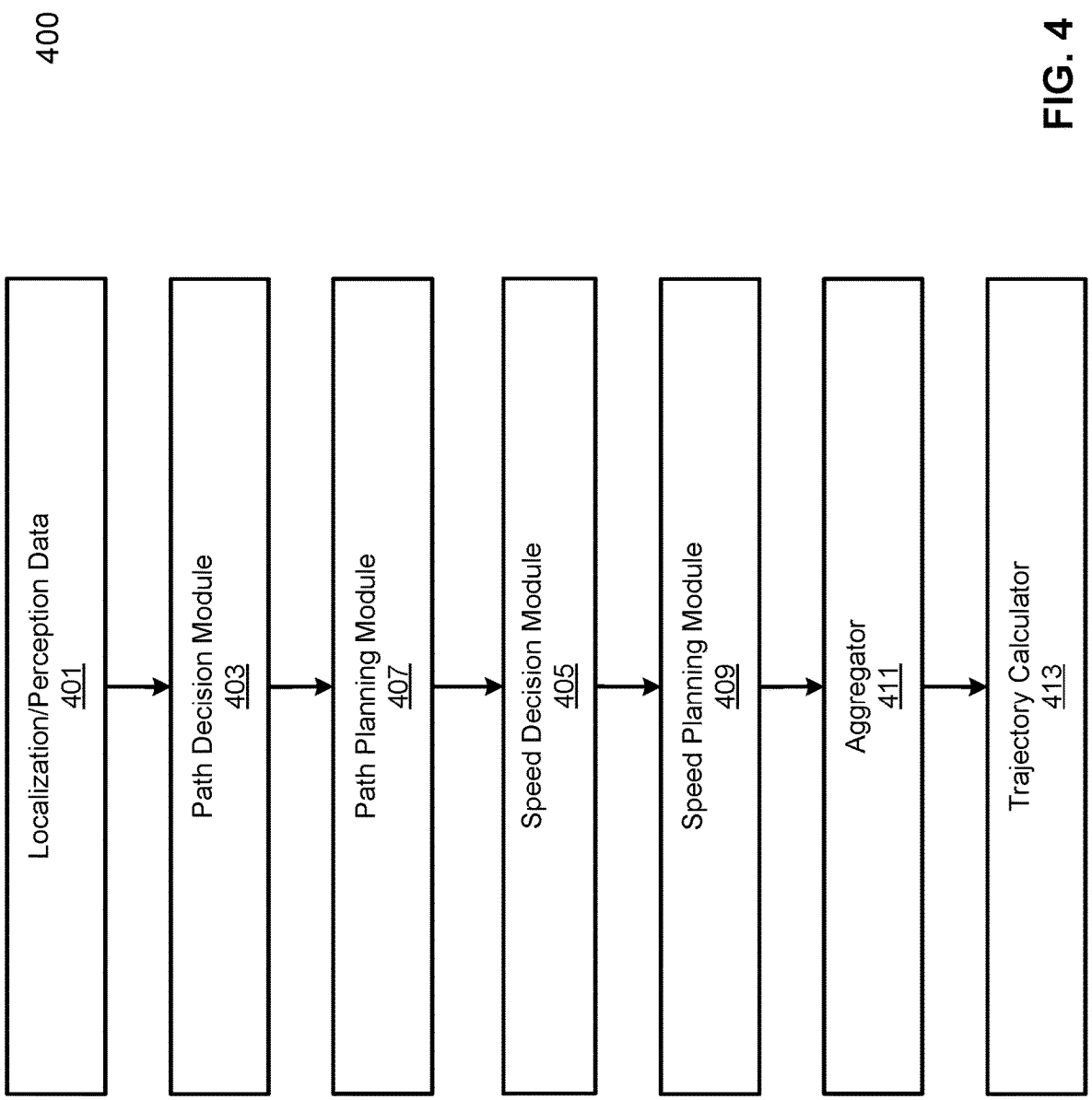

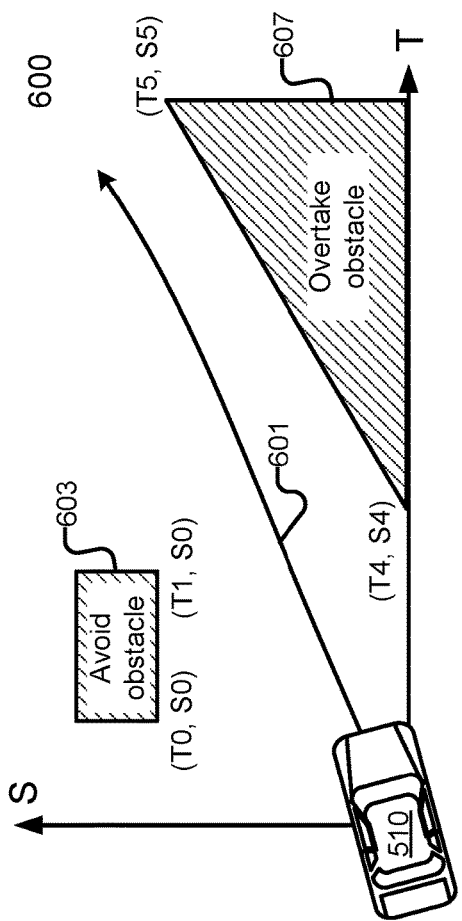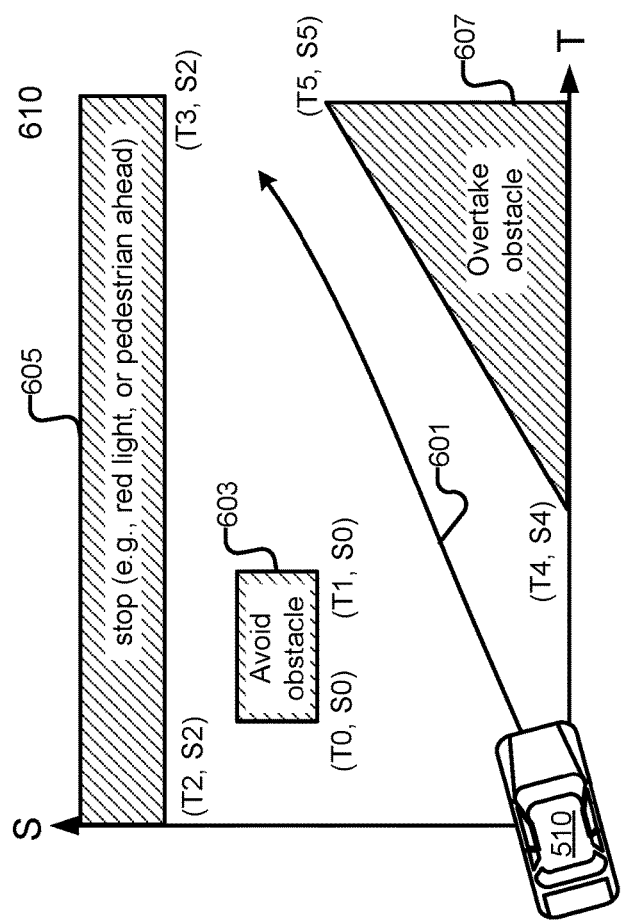

PLANNING SYSTEM FOR SPEED LIMIT CHANGES FOR AUTONOMOUS VEHICLES

TECHNICAL FIELD

Embodiments of the present disclosure relate generally to operating autonomous driving vehicles. More particularly, embodiments of the disclosure relate to a planning system for speed limit changes for autonomous driving vehicles (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

Speed limits are generally indicated on a traffic sign expressed as kilometers per hour (km/h) reflecting the legal maximum or minimum speed road vehicles may travel on a given segment of road. Some county/city roads have a legally assigned maximum speed limit even when no speed limit indications are present.

BRIEF DESCRIPTION OF THE DRAWINGS

Embodiments of the disclosure are illustrated by way of example and not limitation in the figures of the accompanying drawings in which like references indicate similar elements.

FIG. 4 is a block diagram illustrating an example of a decision and planning system according to one embodiment.

FIGS. 6A and 6B are block diagrams illustrating station-time maps according to some embodiments.

DETAILED DESCRIPTION

Figure 1:
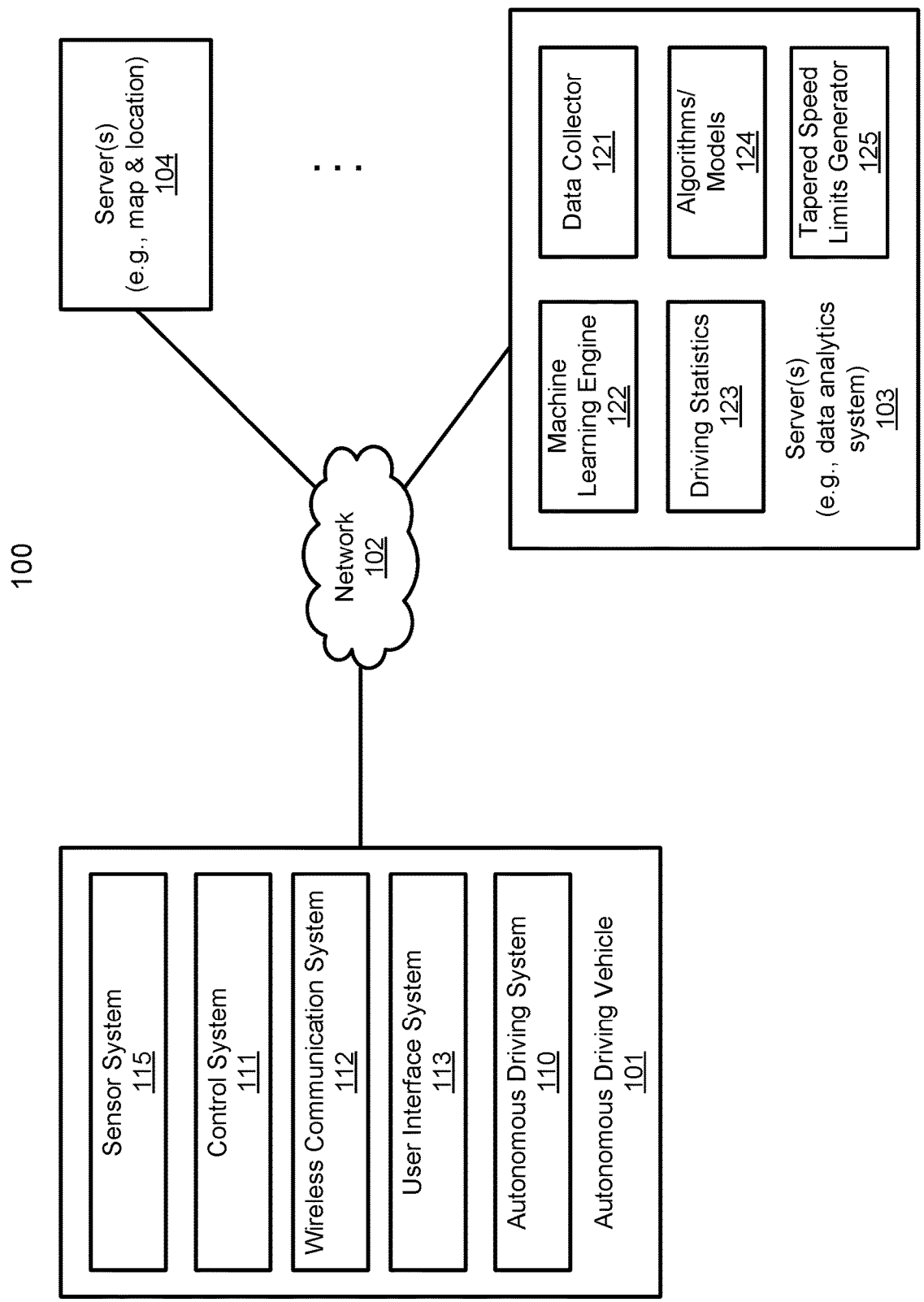
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Posted legal maximum (or minimum) road speed limits guide an operator to slow down (or speed up) a vehicle for safety purposes. For an autonomous vehicle (ADV), the posted speed limits can be determined by perceiving an environment of the ADV. The posted speed limits can further be retrieved from a map data based on a current road of the ADV. Here, the map data is preconfigured with the posted speed limit information.

When the posted speed limit for a road suddenly drops, e.g., from 100 to 40 km/h, as in the case of a freeway exit-ramp or a sharp turn, an ADV typically applies a sharp brake control to stay within the next posted speed limit. The following embodiments dampens the sudden sharp brake control.

According to a first aspect, a speed planning system receives speed limit information for an autonomous driving vehicle (ADV), where the speed limit information includes a change in road speed limit for a current road of the ADV. The system determines a tapered speed limit corresponding to the current road based on the speed limit information, where the tapered speed limit correspond to a gradual speed reduction from a first road speed limit to a second road speed limit. The system determines a cost function based on the tapered speed limit and the first and second road speed limits. The system generates a number of trajectory candidates based on the cost function. The system selects a trajectory based on the trajectory candidates to control the ADV using the selected trajectory.

According to a second aspect, a system determines a reference speed curve to gradually slow down an autonomous driving vehicle (ADV). For each section (or segment) of a plurality of road sections in map information for an ADV, the system determines a reduction in speed limit for the road section from a first speed limit to a second speed limit. The system generates a tapered speed limit for the road section from the first speed limit to the second speed limit based on the reference speed curve. The system stores the tapered speed limit for the section of road in the map information, where the tapered speed limit is used by the ADV to generate driving trajectory candidates.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
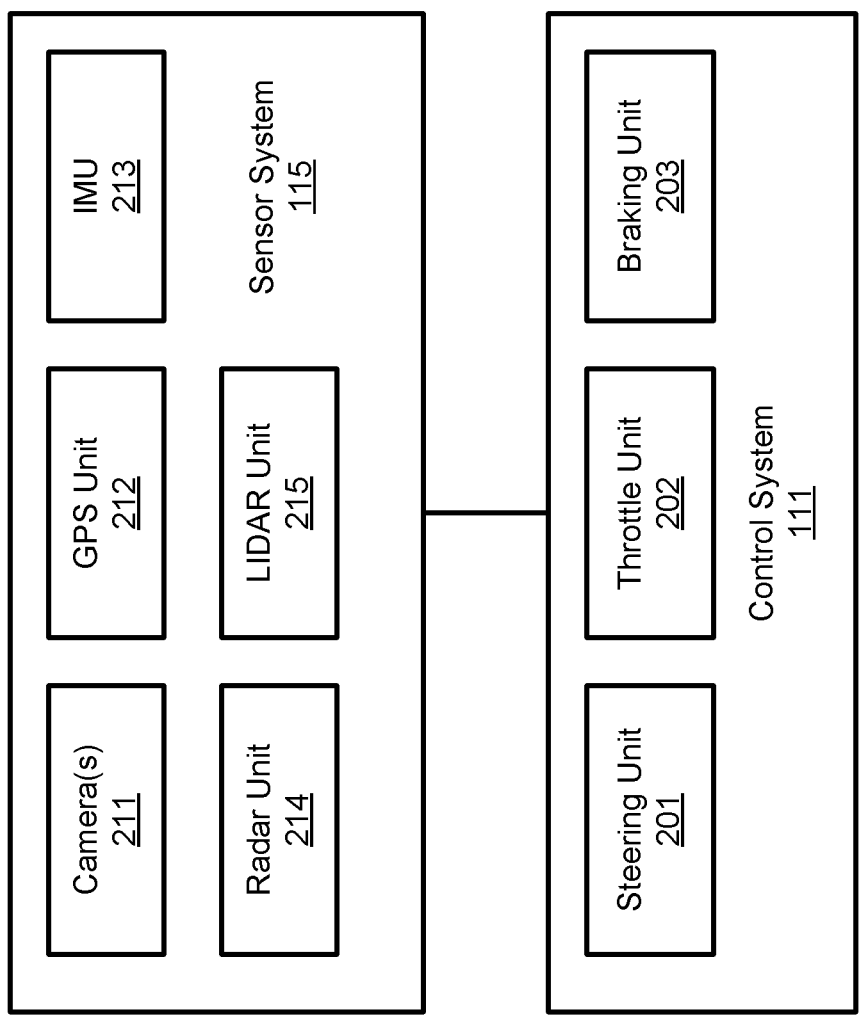
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include cost functions to generate planning trajectories based on a tapered speed limit in conjunction with posted road speed limits. The tapered speed limit can be a soft constraint (posted road speed limits are hard constraints) and is generated based on the posted road speed limits to guide an ADV for a smoother drive. Algorithms 124 can then be uploaded on ADVs to be utilized during autonomous driving in real-time.

Tapered speed limit generator 125 can generate a number of tapered speed limits for each road segments. Similar to the posted road speed limits, the tapered speed limits indicate a maximum (or minimum) speed limit for the segment of the road, but only as a soft constraint (a constraint that is not absolutely enforced) for an ADV. The tapered speed limits can be stored in speed limit information (e.g., as part of map & route data 311 and/or speed limits information 313 of FIG. 3A) or as a soft constraint to be used by an ADV to generate one or more driving trajectories for the ADV. For example, the tapered speed limits can include one or more speed limits gradually reduces from a higher (e.g., 100 km/h) to a lower speed (e.g., 40 km/h) limit along segments of a road. The tapered speed limits can be used by the ADV to generate/select a driving trajectory to slow down the ADV from the higher to the lower speed limits, with a minimal brake control.

Figure 3A:
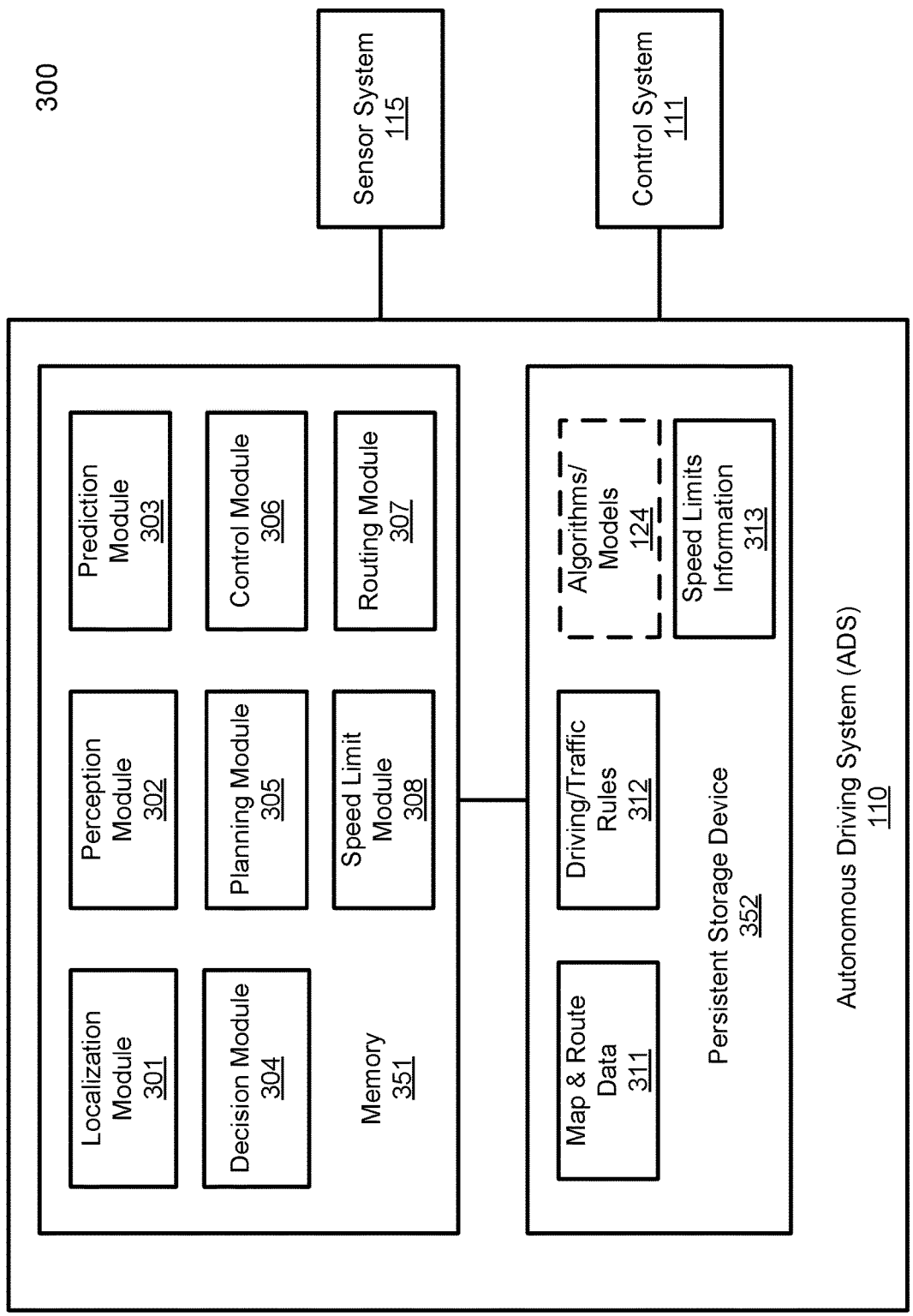
FIGS. 3A-3B are block diagrams illustrating an example of an autonomous driving system used with an autonomous driving vehicle according to one embodiment.
Figure 3B:
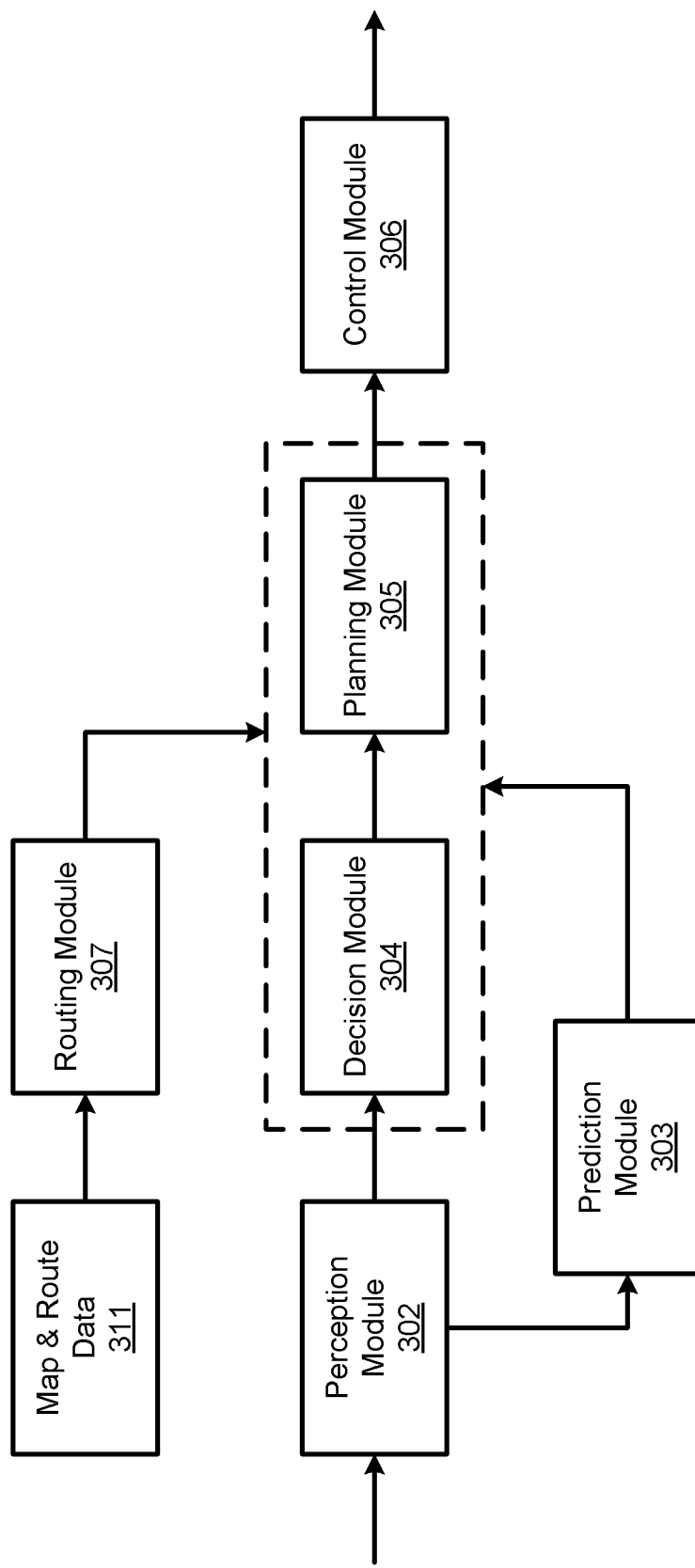

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, and speed limit module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module. For example, module 308 may be integrated as a part of planning module 305.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Speed limit module 308 can generate a plurality of speed curves (or trajectories) based on a speed planning cost function. The speed planning cost function has components corresponding the posted road speed limits (max or min) in conjunction with gradual slow down (tapered) speed limits corresponding to the posted road speed limits.

FIG. 4 is a block diagram illustrating an example of a decision and planning system according to one embodiment. System 400 may be implemented as part of autonomous driving system 300 of FIGS. 3A-3B to perform path planning and speed planning operations. Referring to FIG. 4, Decision and planning system 400 (also referred to as a planning and control or PnC system or module) includes, amongst others, routing module 307, localization/perception data 401, path decision module 403, speed decision module 405, path planning module 407, speed planning module 409, aggregator 411, and trajectory calculator 413.

Path decision module 403 and speed decision module 405 may be implemented as part of decision module 304. In one embodiment, path decision module 403 may include a path state machine, one or more path traffic rules, and a station-lateral maps generator. Path decision module 403 can generate a rough path profile as an initial constraint for the path/speed planning modules 407 and 409 using dynamic programming.

In one embodiment, the path state machine includes at least three states: a cruising state, a changing lane state, and/or an idle state. The path state machine provides previous planning results and important information such as whether the ADV is cruising or changing lanes. The path traffic rules, which may be part of driving/traffic rules 312 of FIG. 3A, include traffic rules that can affect the outcome of a path decisions module. For example, the path traffic rules can include traffic information such as construction traffic signs nearby the ADV can avoid lanes with such construction signs. From the states, traffic rules, reference line provided by routing module 307, and obstacles perceived by perception module 302 of the ADV, path decision module 403 can decide how the perceived obstacles are handled (i.e., ignore, overtake, yield, stop, pass), as part of a rough path profile.

For example, in one embedment, the rough path profile is generated by a cost function consisting of costs based on: a curvature of path and a distance from the reference line and/or reference points to obstacles. Points on the reference line are selected and are moved to the left or right of the reference lines as candidate movements representing path candidates. Each of the candidate movements has an associated cost. The associated costs for candidate movements of one or more points on the reference line can be solved using dynamic programming for an optimal cost sequentially, one point at a time.

In one embodiment, a state-lateral (SL) maps generator (not shown) generates an SL map as part of the rough path profile. An SL map is a two-dimensional geometric map (similar to an x-y coordinate plane) that includes obstacles information perceived by the ADV. From the SL map, path decision module 403 can lay out an ADV path that follows the obstacle decisions. Dynamic programming (also referred to as a dynamic optimization) is a mathematical optimization method that breaks down a problem to be solved into a sequence of value functions, solving each of these value functions just once and storing their solutions. The next time the same value function occurs, the previous computed solution is simply looked up saving computation time instead of recomputing its solution.

Speed decision module 405 or the speed decision module includes a speed state machine, speed traffic rules, and a station-time graphs generator (not shown). Speed decision process 405 or the speed decision module can generate a rough speed profile as an initial constraint for the path/speed planning modules 407 and 409 using dynamic programming. In one embodiment, the speed state machine includes at least two states: a speed-up state and/or a slow-down state. The speed traffic rules, which may be part of driving/traffic rules 312 of FIG. 3A, include traffic rules that can affect the outcome of a speed decisions module. For example, the speed traffic rules can include traffic information such as red/green traffic lights, another vehicle in a crossing route, etc. From a state of the speed state machine, speed traffic rules, rough path profile/SL map generated by decision module 403, and perceived obstacles, speed decision module 405 can generate a rough speed profile to control when to speed up and/or slow down the ADV. The SL graphs generator can generate a station-time (ST) graph as part of the rough speed profile.

In one embodiment, path planning module 407 includes one or more SL maps, a geometry smoother, and a path costs module (not shown). The SL maps can include the station-lateral maps generated by the SL maps generator of path decision module 403. Path planning module 407 can use a rough path profile (e.g., a station-lateral map) as the initial constraint to recalculate an optimal reference line using quadratic programming. Quadratic programming (QP) involves minimizing or maximizing an objective function (e.g., a quadratic function with several variables) subject to bounds, linear equality, and inequality constraints.

One difference between dynamic programming and quadratic programming is that quadratic programming optimizes all candidate movements for all points on the reference line at once. The geometry smoother can apply a smoothing algorithm (such as B-spline or regression) to the output station-lateral map. The path costs module can recalculate a reference line with a path cost function, to optimize a total cost for candidate movements for reference points, for example, using QP optimization performed by a QP module (not shown). For example, in one embodiment, a total path cost function can be defined as follows:

$$\text{path cost} = \Sigma_{points}(\text{heading})^2 + \Sigma_{points}(\text{curvature})^2 + \Sigma_{points}(\text{distance})^2,$$

where the path costs are summed over all points on the reference line, heading denotes a difference in radial angles (e.g., directions) between the point with respect to the reference line, curvature denotes a difference between curvature of a curve formed by these points with respect to the reference line for that point, and distance denotes a lateral (perpendicular to the direction of the reference line) distance from the point to the reference line. In some embodiments, distance represents the distance from the point to a destination location or an intermediate point of the reference line. In another embodiment, the curvature cost is a change between curvature values of the curve formed at adjacent points. Note the points on the reference line can be selected as points with equal distances from adjacent points. Based on the path cost, the path costs module can recalculate a reference line by minimizing the path cost using quadratic programming optimization, for example, by the QP module.

Speed planning module 409 includes station-time graphs, a sequence smoother, and a speed costs module. The station-time graphs can include a ST graph generated by the ST graphs generator of speed decision module 405. Speed planning module 409 can use a rough speed profile (e.g., a station-time graph) and results from path planning module 407 as initial constraints to calculate an optimal station-time curve. The sequence smoother can apply a smoothing algorithm (such as B-spline or regression) to the time sequence of points. The speed costs module can recalculate the ST graph with a speed cost function to optimize a total cost for movement candidates (e.g., speed up/slow down) at different points in time.

For example, in one embodiment, a total speed cost function can be:

$$\text{speed cost} = \Sigma_{points}(\text{speed'})^2 + \Sigma_{points}(\text{speed''})^2 + (\text{distance})^2,$$

where the speed costs are summed over all time progression points, speed' denotes an acceleration value or a cost to change speed between two adjacent points, speed'' denotes a jerk value, or a derivative of the acceleration value or a cost to change the acceleration between two adjacent points, and distance denotes a distance from the ST point to the destination location. Here, the speed costs module calculates a station-time graph by minimizing the speed cost using quadratic programming optimization, for example, by the QP module.

Aggregator 411 performs the function of aggregating the path and speed planning results. For example, in one embodiment, aggregator 411 can combine the two-dimensional ST graph and SL map into a three-dimensional SLT graph. In another embodiment, aggregator 411 can interpolate (or fill in additional points) based on two consecutive points on an SL reference line or ST curve. In another embodiment, aggregator 411 can translate reference points from (S, L) coordinates to (x, y) coordinates. Trajectory generator 413 can calculate the final trajectory to control ADV 510. For example, based on the SLT graph provided by aggregator 411, trajectory generator 413 calculates a list of (x, y, T) points indicating at what time should the ADC pass a particular (x, y) coordinate.

Thus, path decision module 403 and speed decision module 405 are configured to generate a rough path profile and a rough speed profile taking into consideration obstacles and/or traffic conditions. Given all the path and speed decisions regarding the obstacles, path planning module 407 and speed planning module 409 are to optimize the rough path profile and the rough speed profile in view of the obstacles using QP programming to generate an optimal trajectory with minimum path cost and/or speed cost.

Figure 5:
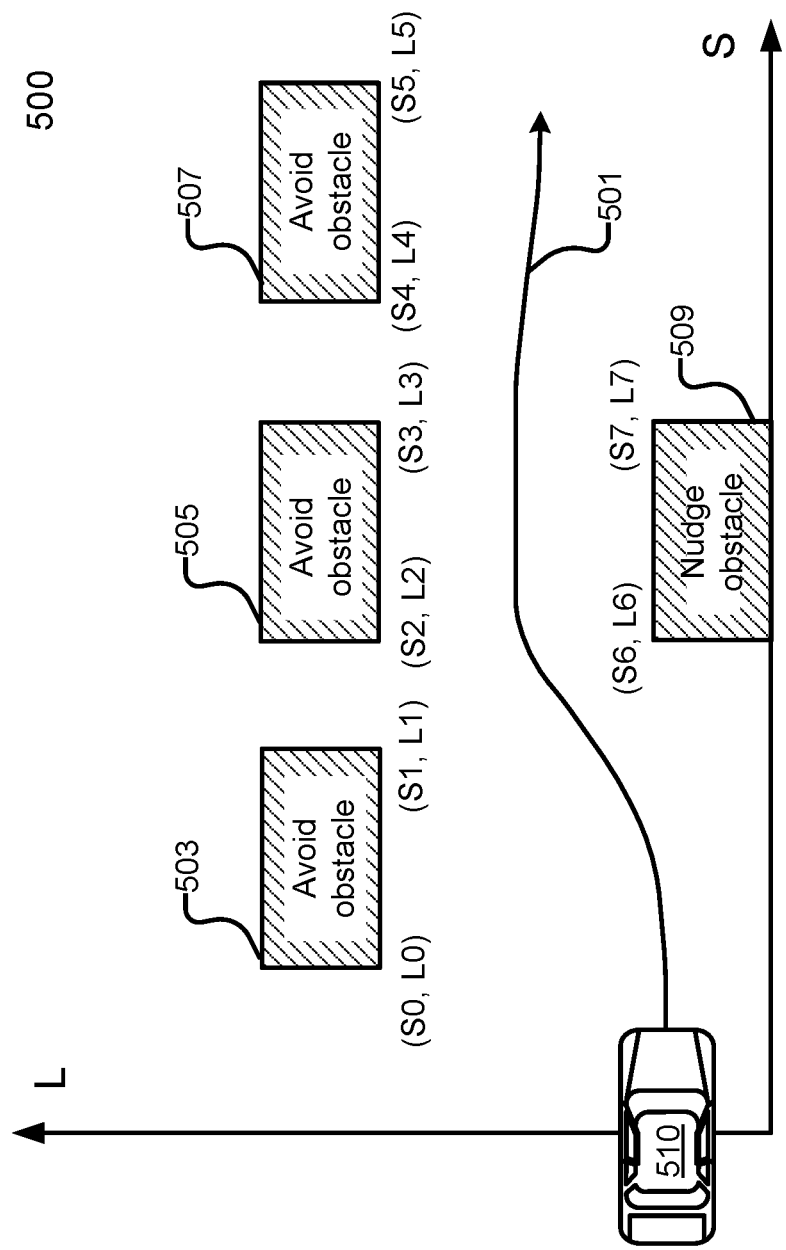
FIG. 5 is a block diagram illustrating a station-lateral map according to one embodiment.

FIG. 5 is a block diagram illustrating a station-lateral map according to one embodiment. Referring to FIG. 5, SL map 500 has an S horizontal axis, or station, and an L vertical axis, or lateral. As described above, station-lateral coordinates are a relative geometric coordinate system that references a particular stationary point on a reference line and follows the reference line. For example, a (S, L)=(1, 0) coordinate can denote one meter ahead of a stationary point (i.e., a reference point) on the reference line with zero meter lateral offset. A (S, L)=(2, 1) reference point can denote two meters ahead of the stationary reference point along the reference line and an one meter perpendicular lateral offset from the reference line, e.g., a left offset.

Referring to FIG. 5, SL map 500 includes reference line 501 and obstacles 503-509 perceived by ADV 510. In one embodiment, obstacles 503-509 may be perceived by a RADAR or LIDAR unit of ADV 510 in a different coordinate system and translated to the SL coordinate system. In another embodiment, obstacles 503-509 may be artificially formed barriers as constraints so the decision and planning modules would not search in the constrained geometric spaces. In this example, a path decision module can generate decisions for each of obstacles 503-509 such as decisions to avoid obstacles 503-508 and nudge (approach very closely) obstacle 509 (i.e., these obstacles may be other cars, buildings and/or structures). A path planning module can then recalculate or optimize reference line 501 based on a path cost in view of obstacles 503-509 using QP programming to fine tune reference line 501 with the minimum overall cost as described above. In this example, the ADV nudges, or approaches very close, for obstacle 509 from the left of obstacle 509.

FIGS. 6A and 6B are block diagrams illustrating station-time maps according to some embodiments. Referring to FIG. 6A, ST graph 600 has a station (or S) vertical axis and a time (or T) horizontal axis. ST graph 600 includes curve 601 and obstacles 603-607. As described above, curve 601 on station-time graph indicates, at what time and how far away is the ADV from a station point. For example, a (T, S)=(10000, 150) can denote in 10000 milliseconds, an ADV would be 150 meters from the stationary point (i.e., a reference point). In this example, obstacle 603 may be a building/structure to be avoided and obstacle 607 may be an artificial barrier corresponding to a decision to overtake a moving vehicle.

Referring to FIG. 6B, in this scenario, artificial barrier 605 is added to the ST graph 610 as a constraint. The artificial barrier can be examples of a red light or a pedestrian in the pathway that is at a distance approximately S2 from the station reference point, as perceived by the ADV. Barrier 705 corresponds to a decision to "stop" the ADV until the artificial barrier is removed at a later time (i.e., the traffic light changes from red to green, or a pedestrian is no longer in the pathway).

Figure 7A:
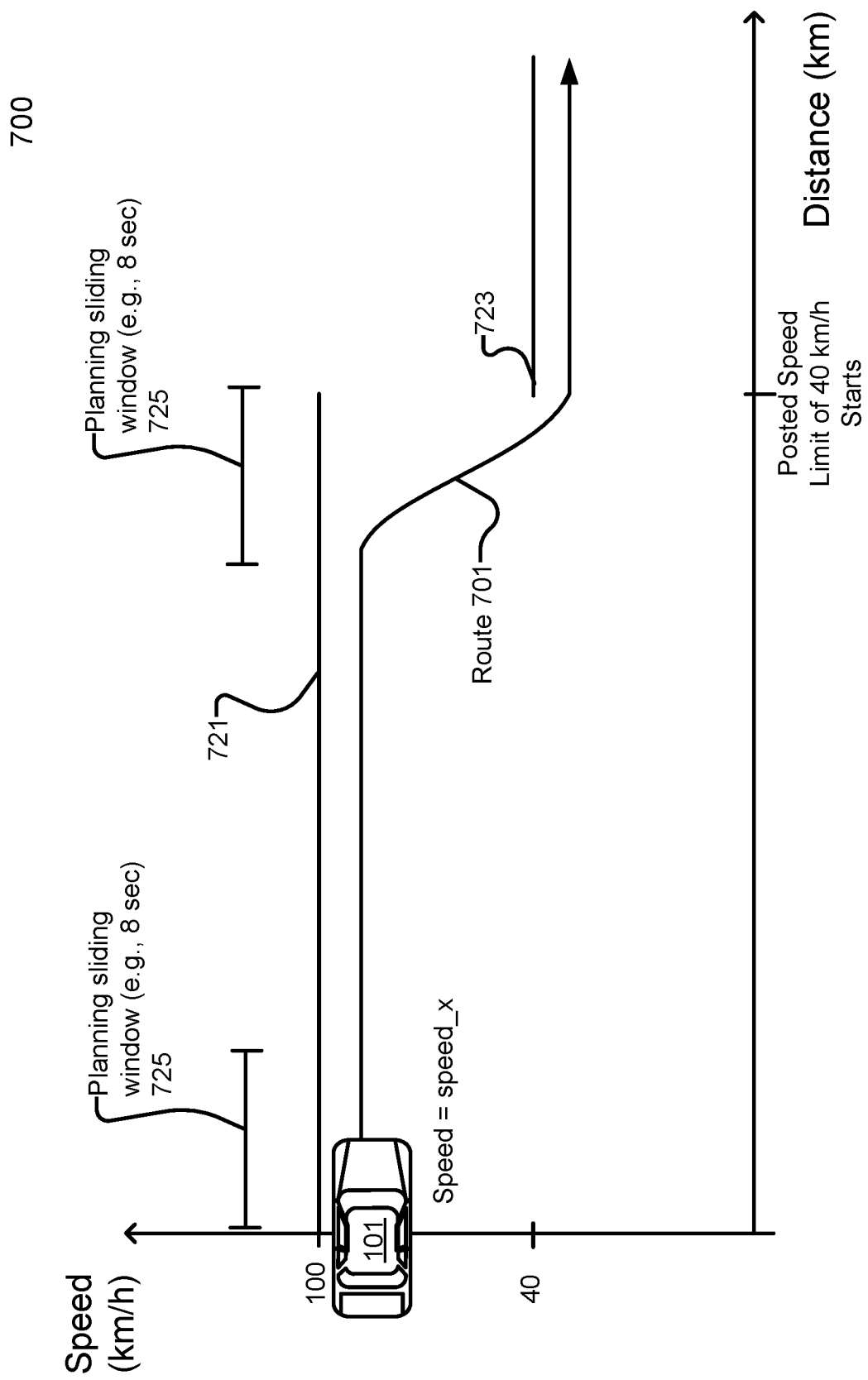
FIGS. 7A-7B are block diagrams illustrating speed versus distance plots for a change in speed limit according to some embodiments.
Figure 7B:
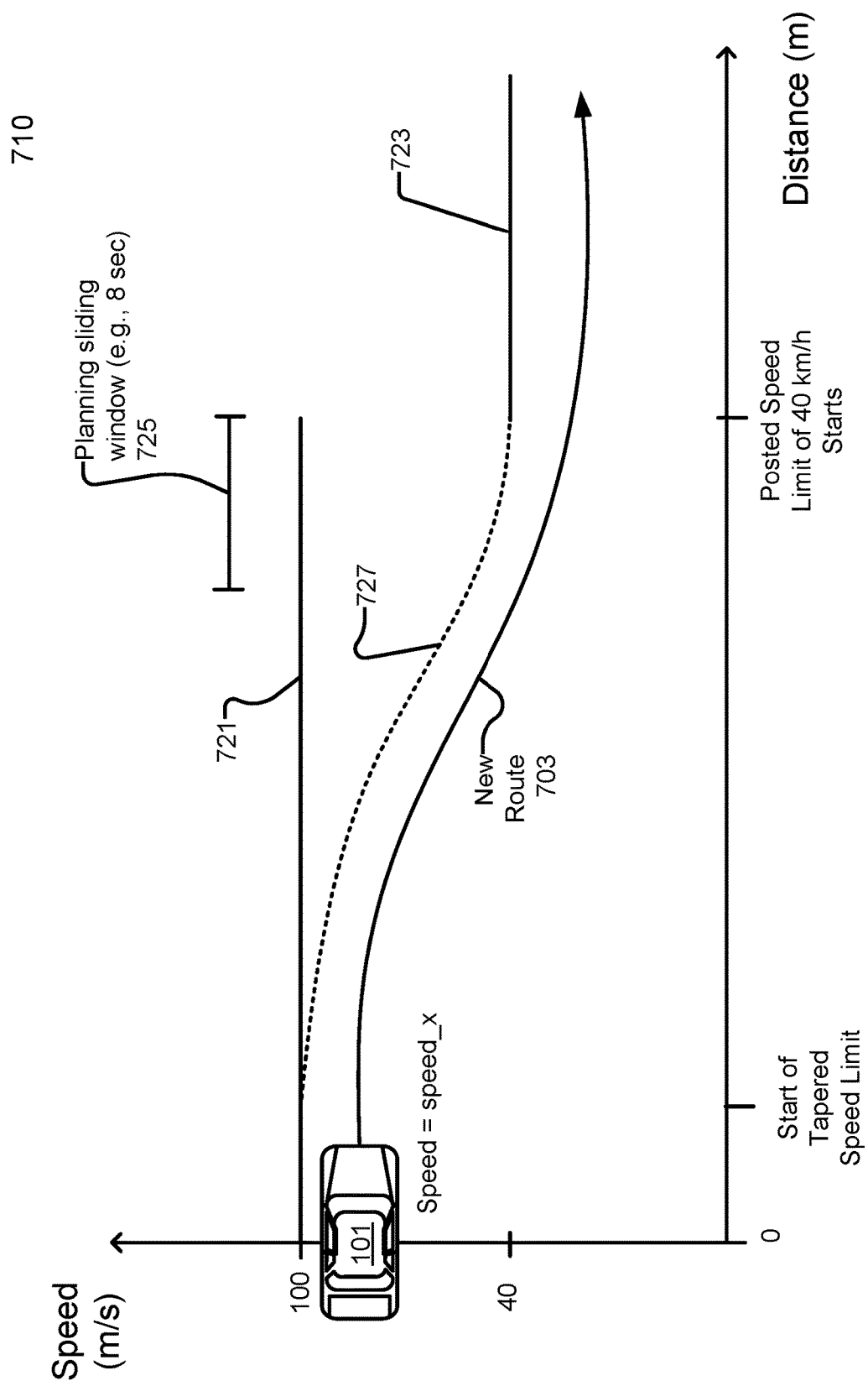

FIGS. 7A-7B are block diagrams illustrating speed versus distance plots for a speed limit change according to some embodiments. Referring to FIG. 7A, plot 700 can represent an ADV 101 on an expressway with a posted speed limit 721. The ADV 101 may have a planned route to exit an off-ramp having a posted speed limit 723. Here, the posted speed limit 721 of 100 km/h is about to change to 40 km/h and ADV 101 may be cruising at a speed (such as ~90 km/h) just below the posted speed limit 721 of 100 km/h.

In one embodiment, ADV 101 may retrieve the posted road speed limit 721 for the current section of the road from map & route data 311 or speed limit information 313 of FIG. 3A. based on a planned path, ADV 101 can generate one or more speed curve (or trajectory) candidates and selects one of the candidates based on a speed planning cost function. The speed planning cost function may be:

$$\text{speed cost} = \Sigma_{points}(\text{speed}')^2 + \Sigma_{points}(\text{speed}'')^2 + (\text{distance})^2 + \text{cost}(\text{speed limit});$$

If speed>road speed limit,cost(speed limit)=max value(e.g.,1.0e9), where speed is a current speed of ADV 101, road speed limit is a posted road speed limit for a road at a current location of the ADV, and max value is set to some large value (e.g., 1.0e9).

Note that a trajectory may be generated for each planning cycle (e.g., 100 ms) and the planning cycle generates the trajectory for a planning window 725. For example, window 725 may be 8 seconds and ADV 101 can generate a trajectory for any planning cycle for the upcoming 8 seconds.

At a planning cycle that is approximately 8 seconds from a start of posted speed limit 723, ADV 101 plans a trajectory with a change in speed limit. That is, ADV 101 has an 8 seconds window to reduce a speed of ADV 101, in most cases, causing ADV 101 to apply a brake abruptly so a planned speed of ADV 101 will be below the post speed limit 723 when ADV 101 reaches the posted speed limit sign for speed limit 723. Here, ADV 101 may follow route 701 with an abrupt speed change right before the posted speed limit 723.

Referring to FIG. 7B, plot 710 may represent plot 700 of FIG. 7A but ADV 101 plans a trajectory according to the posted speed limits 721, 723, and tapered speed limit 727. In one embodiment, ADV 101 may retrieve the posted road speed limit 721 and tapered speed limit 727 from map & route data 311 or speed limit information 313 of FIG. 3A. The tapered speed limit 727 may be over a road section of 500 meters with suggested speed limits of 90 km/h (at 500 m), 80 km/h (at 400 m), 70 km/h (at 300 m), 60 km/h (at 200 m), 50 km/h (at 100 m), and 40 km/h (at 0m from the boundary of the speed limit change). ADV 101 then plans a trajectory based on a modified speed planning cost function having a cost corresponding to both the road speed limit 721, 723, and/or tapered speed limit 727 for a planning window 725. The modified speed planning cost function may be:

$$\text{speed cost} = \Sigma_{points}(\text{speed}')^2 + \Sigma_{points}(\text{speed}'')^2 + (\text{distance})^2 + \text{cost}(\text{speed limit});$$

If speed>road speed limit,cost(speed limit)=max value(e.g.,1.0e9);

If speed<tapered speed limit,cost(speed limit)=0; and

If road speed limit>speed>tapered speed limit,cost (speed limit)=α(speed−tapered speed limit), where speed is a current speed of ADV 101, road speed limit is a posted road speed limit for a road at a current location of the ADV, tapered speed limit is the tapered speed limit, max value is set to some large value (e.g., 1.0e9), and a is a scaling factor.

In one embodiment, based on a path route, ADV 101 generates one or more speed curves and selects one speed curve based on the modified speed planning cost function. In one embodiment, if ADV 101 is planned to overtake a vehicle, the scaling factor α may be adjusted such that a cost associated with having a tapered speed limit is nullified and ADV 101 can speed up to the posted road speed limit to overtake a vehicle. Note, the path route and one of the speed curve candidates can be combined to generate a trajectory candidate. ADV 101 then selects a speed curve (or trajectory candidate) having the lowest cost based on the modified speed planning cost function. The trajectory candidate is then used to control ADV 101. Note that because ADV 101 can plan a trajectory based on a tapered speed limit, the planned trajectory can gradually reduce a speed of ADV 101 without apply a brake control (e.g., tapered speed limit is generated with such a characteristic), and thus, ADV 101 speed planning can reduce a speed for ADV 101 without applying a brake control. That is, ADV 101 is not limited to the predetermined speed planning sliding window 725 of 8 seconds and a planned trajectory can avoid an abrupt brake control.

Figure 8A:
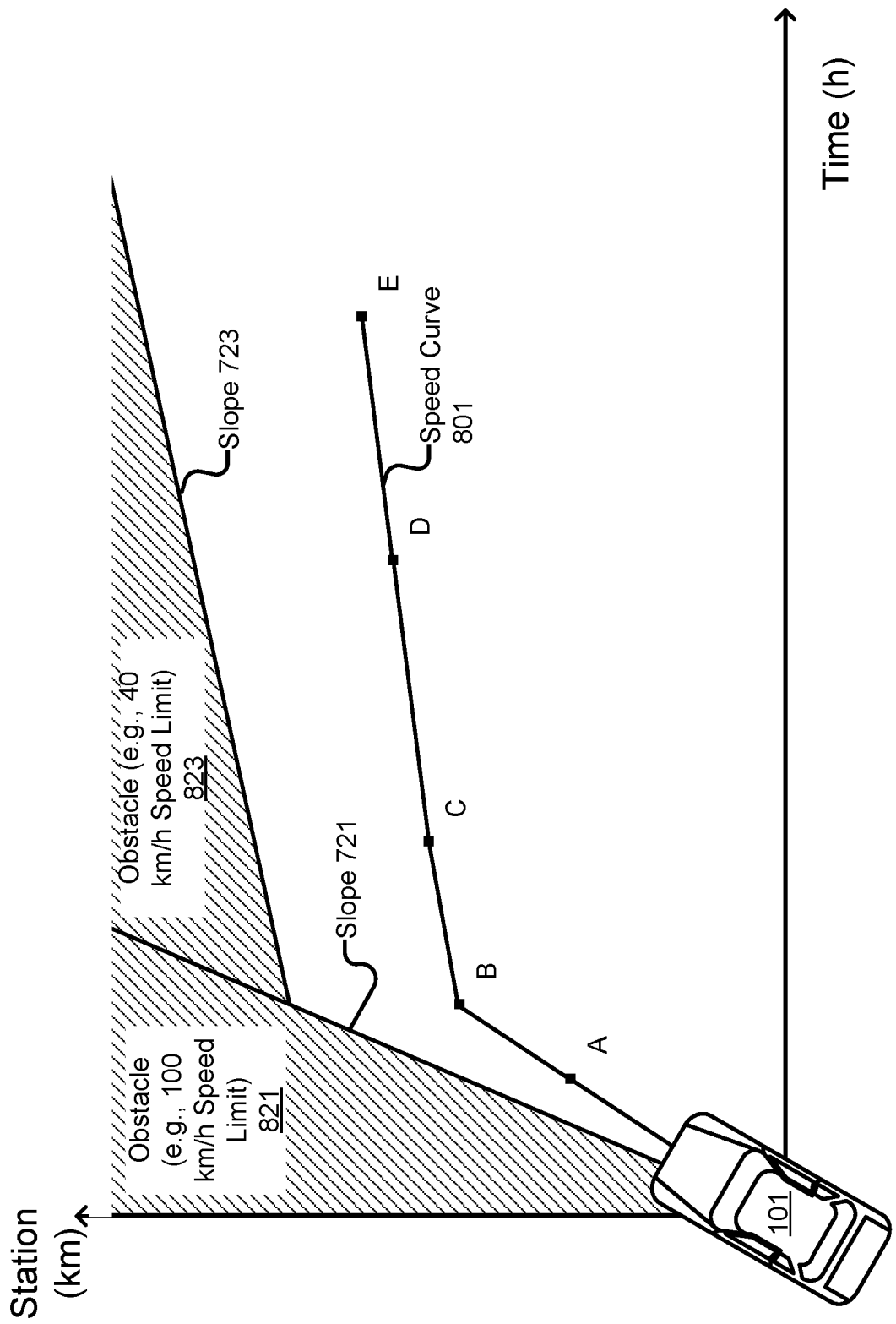
FIGS. 8A-8B are block diagrams illustrating station-time maps according to some embodiments.
Figure 8B:
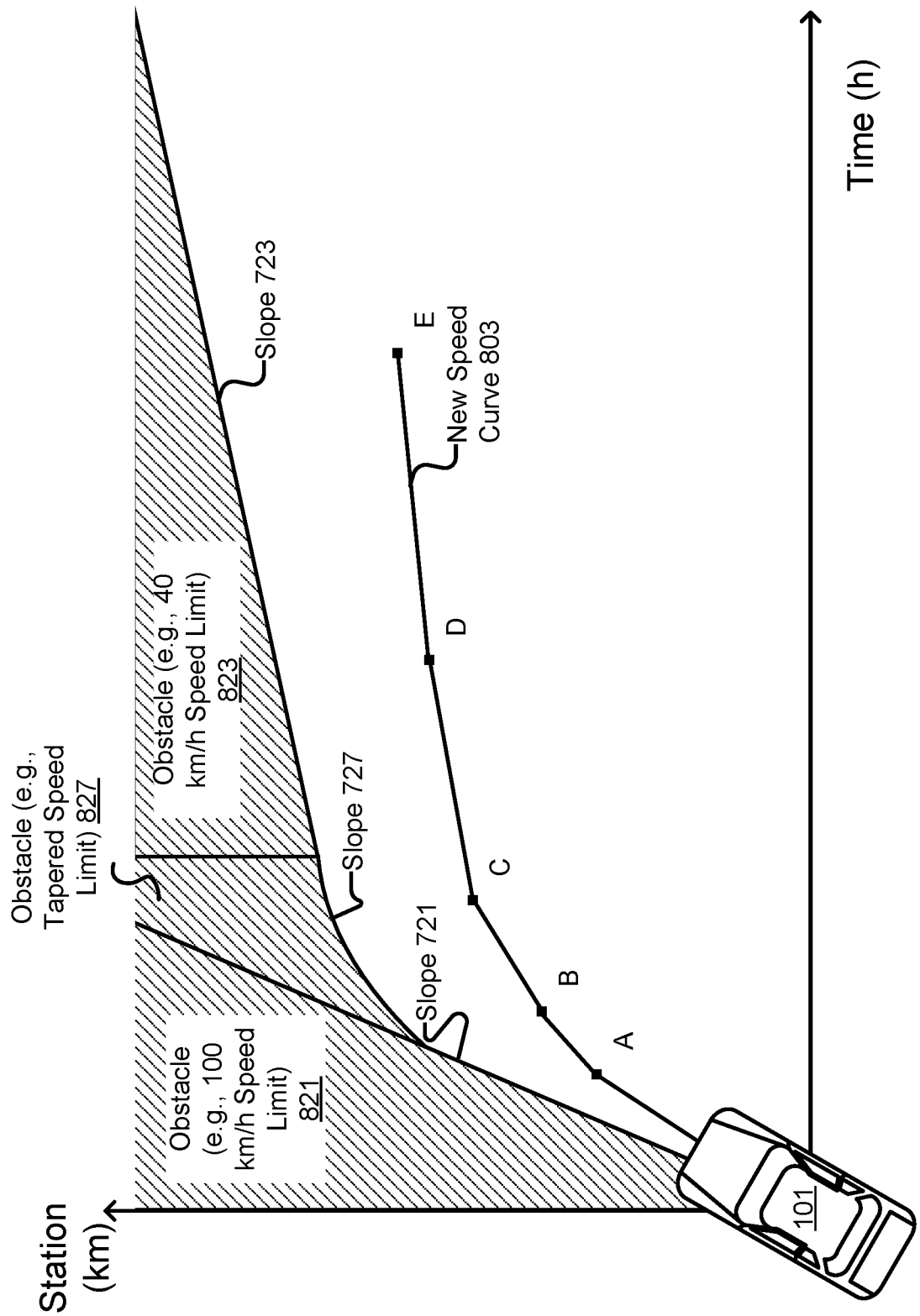

FIGS. 8A-8B are block diagrams illustrating station-time maps according to some embodiments. FIG. 8A can correspond to FIG. 7A and FIG. 8B can correspond to FIG. 7B. Referring to FIG. 8A, ST graph 800 has a station (or S) vertical axis and a time (or T) horizontal axis. ST graph 800 includes speed curve 801 and obstacles 821, 823. Obstacles 821, 823 may represent artificial barriers corresponding to road speed limits 721 (100 km/h) and 723 (40 km/h) of FIG. 7A, respectively. Here, slope 721 for obstacle 821 is 100 km/h and slope 723 for obstacle 823 is 40 km/h. In one embodiment, ADV 101 generates one or more speed curves and selects curve 801 based on optimization of a speed planning cost function. E.g., a hard constraint is applied such that slope of curve 801 at points A, B should be less than slope 721; and the slope of curve 801 at points C, D, E should be less than slope 723.

Here, because the slope between slope 721 and slope 723 is abrupt (e.g., speed limit 100 km/h changes to 40 km/h), curve 801 includes an abrupt speed change (e.g., a sharp brake control). Thus, ADV 101 plans a speed curve with an abrupt speed change.

Referring to FIG. 8B, in one embodiment, ST graph 810 may be similar to ST graph 800 except ADV 101 takes into consideration a taper speed limit. ST graph 810 includes speed curve 803 and obstacles 821, 823, and 827. Obstacles 821, 823, and 827 may represent artificial barriers corresponding to the road speed limits 721 (100 km/h), 723 (40 km/h); and tapered speed limit 727 of FIG. 7B, respectively.

In one embodiment, ADV 101 generates ST graph 810 for speed planning. Based on ST graph 810, one or more speed curve candidates (or trajectory candidates) are generated at each planning cycle and one speed curve is selected as the optimal speed curve based on a modified speed planning cost function. For example, one or more speed curve candidates (not shown) can be generated at point A, and a curve from the candidates is selected as the optimal curve. Each curve may be selected along points A, B, C, D, and E for a speed curve 803. In one embodiment, a planning system of ADV 101 controls ADV 101 based on a selected speed curve (or trajectory). Because the speed curve along points B and C is constrained by tapered speed limit 827 (e.g., slope 727), curve along points B and C has a gradual change in speed (e.g., a gradual deceleration). In one embodiment, the gradual deceleration for the ADV 101 corresponds to a deceleration from a first speed limit of 100 km/h to a second speed limit of 40 km/h without applying a brake while maintaining a same steering for ADV 101.

Figure 9:
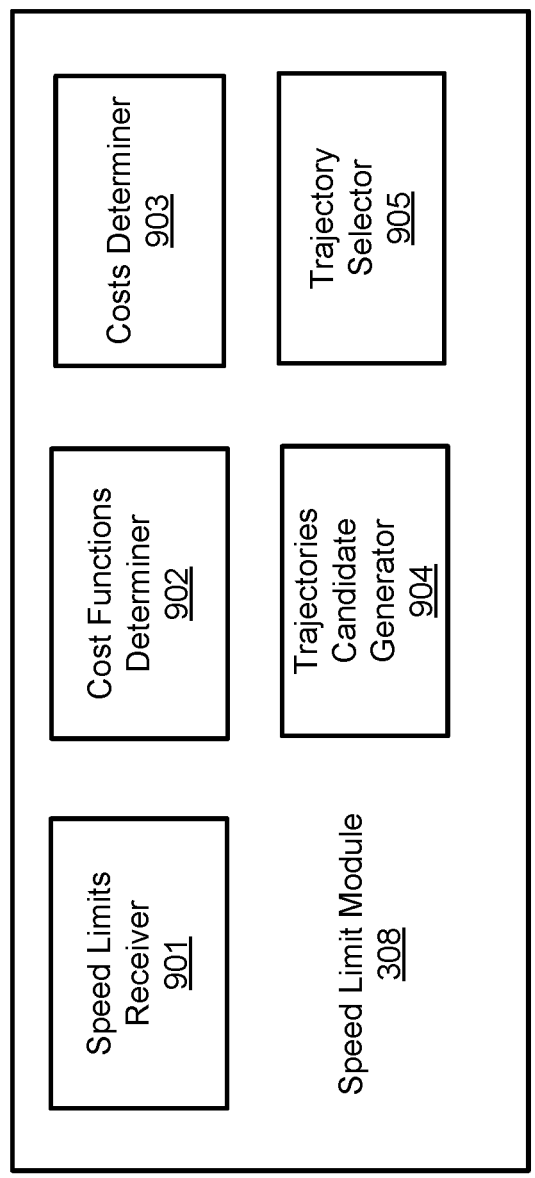
FIG. 9 is a block diagram illustrating a speed limit module according to one embodiment.

FIG. 9 is a block diagram illustrating a speed limit module according to one embodiment. Speed limit module 308 can generate a number of trajectory candidates based on a speed cost function, where a trajectory candidate with the lower cost is selected to control an ADV. Referring to FIG. 9, speed limit module 308 can include submodules such as speed limits receiver 901, cost function determiner 902, costs determiner 903, speed curve/trajectory generator 904, and trajectory selector 905. Speed limits receiver 901 can receive one or more speed limits from map data. The map data may be data streamed from a server (such as server 103 of FIG. 1), or data local to ADV 101, such as map and route data 311 of FIG. 3A. The speed limits may be posted road legal (maximum or minimum) speed limits or tapered (gradual slow down) speed limits associated with a steep drop in speed limits for sections of a road.

Cost function determiner 902 can determine a speed cost function for optimization to calculate one or more trajectory (or speed curve) candidates. Costs determiner 903 can determine a cost associated with each trajectory candidate. Speed curve/trajectory candidate generator 904 can generate one or more trajectory candidates. trajectory selector 905 can select one of the trajectory candidates as the trajectory to control the ADV 101. Here, trajectories are path routes having speed information along the path routes (or a path route combined with a speed curve) such that the planning system of an ADV can control the ADV autonomously.

Figure 10:
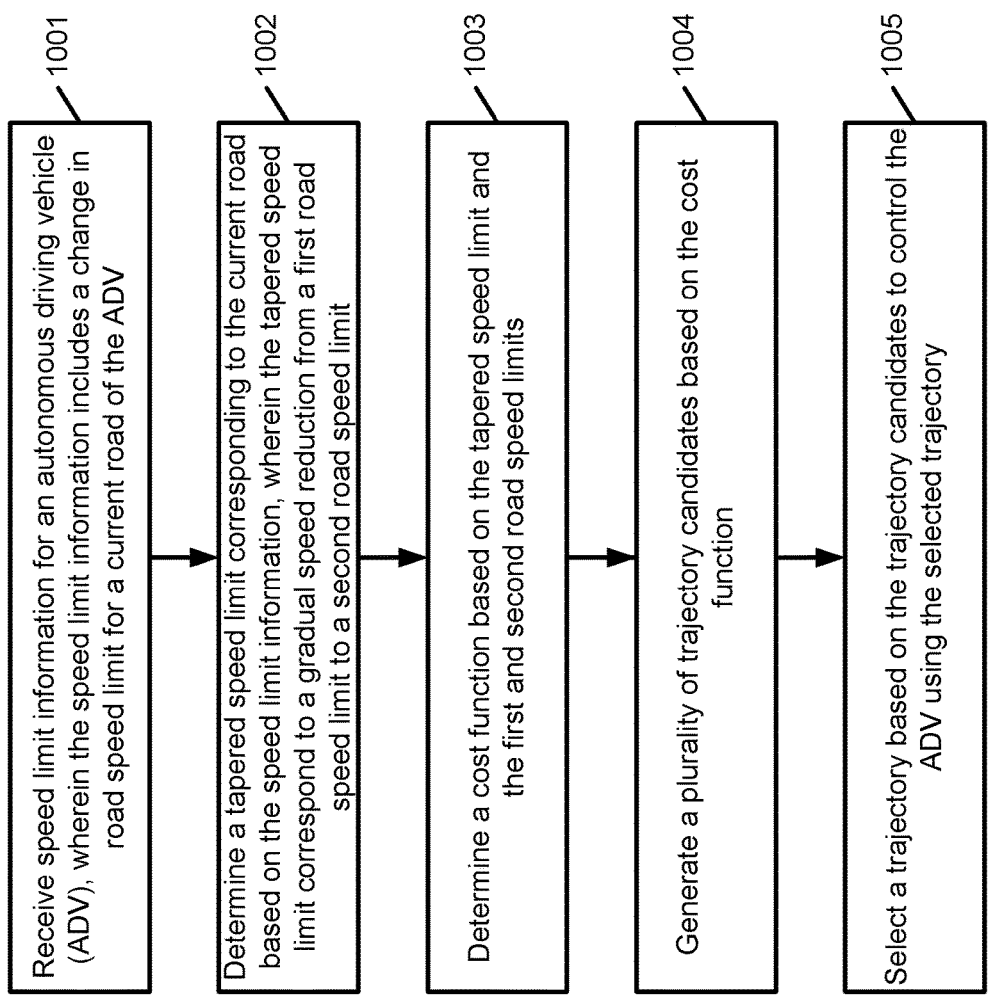
FIG. 10 is a flow diagram illustrating a speed planning with gradual speed limits method according to one embodiment.

FIG. 10 is a flow diagram illustrating a speed planning with gradual speed limits method according to one embodiment. Processing 1000 may be performed by processing logic which may include software, hardware, or a combination thereof. For example, process 1000 may be performed by speed limit module 308 of FIG. 9. Referring to FIG. 10, at block 1001, processing logic receives speed limit information for an autonomous driving vehicle (ADV), where the speed limit information includes a changing road speed limit for a current road of the ADV. At block 1002, processing logic determines a tapered speed limit corresponding to the current road based on the speed limit information, where the tapered speed limit correspond to a gradual speed reduction from a first road speed limit to a second road speed limit. At block 1003, processing logic determines a cost function based on the tapered speed limit and the first and second road speed limits. At block 1004, processing logic generates a number of trajectory candidates based on the cost function. at block 1005, processing logic selects a trajectory based on the trajectory candidates to control the ADV using the selected trajectory.

In one embodiment, the tapered speed limit is generated in response to determining that the current road of the ADV has an impending reduction in road speed limits. In one embodiment, a speed planning system of the ADV has a planning time window smaller than a time window required for the ADV to slow down from the first road speed limit to the second road speed limit without applying a brake control.

In one embodiment, a cost of the cost function is set to a maximum cost for a trajectory candidate having a planned speed greater than a road speed limit for a corresponding section of the road. In one embodiment, a cost of the cost function is set to a zero cost for a trajectory candidate having a planned speed less than the tapered speed limit.

In one embodiment, a cost of the cost function is set to a value proportional to a difference of the planned speed and the tapered speed limit for a trajectory candidate having a planned speed between the tapered speed limit and the road speed limit for the corresponding section of the road. In one embodiment, the cost function includes jerk, acceleration, speed, and/or distance costs.

Figure 11:
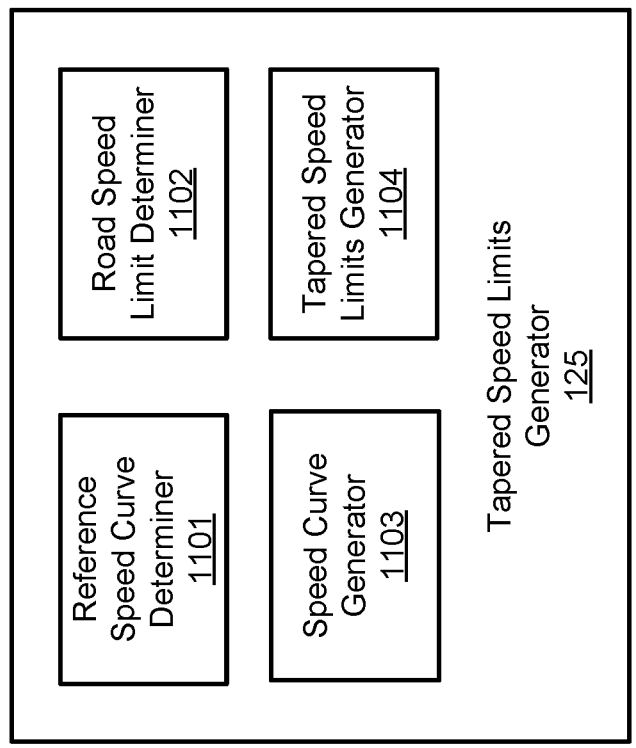
FIG. 11 is a block diagram illustrating a tapered speed limits generator according to one embodiment.

FIG. 11 is a block diagram illustrating a tapered speed limits generator according to one embodiment. Tapered speed limits generator 125 can generate one or more tapered speed limits (offline) to supplement posted speed limits of a roadway where there is a change in the posted speed limit. The change in the posted speed limits can be a change from a higher to a lower speed limit. Referring to FIG. 11, tapered speed limits generator 125 can include submodules such as reference speed curve determiner 1101, road speed limit determiner 1102, speed curve generator 1103, and tapered speed limits generator 1104. Reference speed curve determiner 1101 can determine a reference speed curve for an ADV. The reference speed curve is a speed curve collected by an operator while operating a vehicle from a higher speed (e.g., 120 km/h) to a lower speed (10 km/h). In on embodiment, the curve data can be collected from a physics simulation for a vehicle operating from a higher speed (e.g., 120 km/h) to a lower speed (10 km/h). The data collected reflects a vehicle having the throttle and brake control released while maintaining a steering to slow down the vehicle from the high speed to the lower speed. A reference speed curve may be collected based on a model, make, or type of vehicles, etc. For example, a first reference speed curve may be used for sedans, while a second reference speed curve is used for trucks, etc.

Road speed limit determiner 1102 can determine (retrieve) the road speed limits for a current road of the ADV. Road speed limit determiner 1102 can also determine an impending change in the speed limit (e.g., from a first road speed limit to a second road speed limit) based on the retrieved road speed limits. Based on the impending change, speed curve generator 1103 can generate a speed curve by truncating/snipping the reference speed curve at a first point corresponding to the first speed limit, and at a second point corresponding to the second speed limit.

Tapered speed limits generator 1104 can map the generated speed curve to a road segment before the point of change in speed limit, e.g., to the road segment corresponding to the higher speed limit, such that the speed curve corresponds to a vehicle gradually slowing down from the first speed limit to the second speed limit. Tapered speed limits generator 1104 can generate a number of speed limits (e.g., tapered speed limits) based on the speed curve and store it as part of speed limit information so an ADV using the speed limit information has access to both the tapered speed limit and the posted road speed limit.

Figure 12:
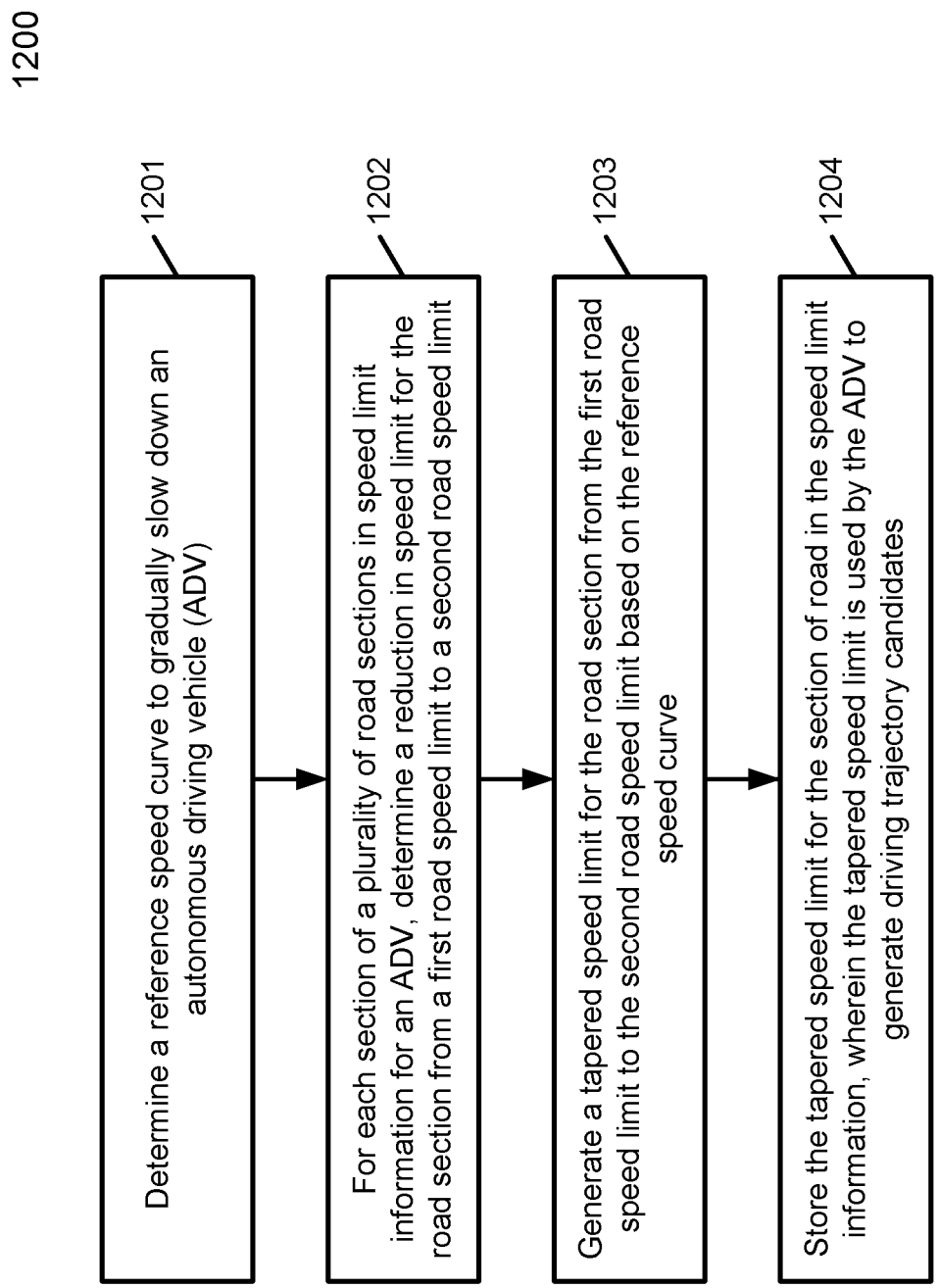
FIG. 12 is a flow diagram illustrating a method to generate gradual speed limits according to one embodiment.

FIG. 12 is a flow diagram illustrating a method to generate gradual speed limits according to one embodiment. Processing 1200 may be performed by processing logic which may include software, hardware, or a combination thereof. For example, process 1200 may be performed by tapered speed limits generator 125 of FIG. 11. Referring to FIG. 12, at block 1201, processing logic determines a reference speed curve to gradually slow down an autonomous driving vehicle (ADV). At block 1202, for each section of a plurality of road sections in speed limit information for an ADV, processing logic determines a reduction in speed limit for the road section from a first speed limit to a second speed limit. At block 1203, processing logic generates a tapered speed limit for the road section from the first speed limit to the second speed limit based on the reference speed curve. At block 1204, processing logic stores the tapered speed limit for the section of road in the speed limit information, where the tapered speed limit is used by the ADV to generate driving trajectory candidates.

In one embodiment, the reference speed curve to gradually slow down an ADV corresponds to a speed curve to slow down an ADV with a throttle and a brake control of the ADV released while maintaining a same steering for the ADV. In one embodiment, the tapered speed limit is generated by truncating the reference speed curve starting at a speed corresponding to the first road speed limit and ending at a speed corresponding to the second road speed limit.

In one embodiment, the tapered speed limit includes a number of speed limits at a number of points along the road section. In one embodiment, the tapered speed limit is used to generate a number of trajectory candidates based on a cost function.

In one embodiment, one of the trajectory candidates is selected as a trajectory having a lowest cost to control the ADV based on the selected trajectory. In one embodiment, a cost of the cost function is set to a maximum cost if a trajectory candidate has a planning speed greater than a road speed limit for a corresponding section of the road.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method to operate an autonomous driving vehicle (ADV), comprising:
   receiving speed limit information for an autonomous driving vehicle (ADV), wherein the speed limit information includes a decrease in road speed limit for a current road of the ADV;
   determining a tapered speed limit corresponding to the current road based on the speed limit information, wherein the tapered speed limit indicates a gradual speed reduction starting at a first road speed limit and decreasing to a second road speed limit;
   determining a cost function based on the tapered speed limit and the first and second road speed limits;
   generating a plurality of trajectory candidates based on the cost function; and
   selecting a trajectory based on the trajectory candidates to control the ADV using the selected trajectory, wherein the selected trajectory gradually reduces a speed of the ADV from the first road speed limit to the second road speed limit.

2. The method of claim 1, wherein the tapered speed limit is generated in response to determining that the current road of the ADV has an impending reduction in road speed limits.

3. The method of claim 1, wherein the ADV has a speed planning time window smaller than a time window required for the ADV to slow down from the first road speed limit to the second road speed limit without applying a brake control.

4. The method of claim 1, wherein a cost of the cost function is set to a maximum cost for a trajectory candidate having a planned speed greater than a road speed limit for a corresponding section of the current road.

5. The method of claim 1, wherein a cost of the cost function is set to a zero cost for a trajectory candidate having a planned speed less than the tapered speed limit.

6. The method of claim 1, wherein a cost of the cost function is set to a value proportional to a difference of a planned speed and the tapered speed limit for a trajectory candidate having a planned speed between the tapered speed limit and the road speed limit for a corresponding section of the current road.

7. The method of claim 1, wherein the cost function is selected from the group consisting of a jerk, an acceleration, a speed, a distance, and one or more speed limit costs.

8. A non-transitory machine-readable medium having instructions stored therein, which when executed by a processor, cause the processor to perform operations, the operations comprising:
   receiving speed limit information for an autonomous driving vehicle (ADV), wherein the speed limit information includes a decrease in road speed limit for a current road of the ADV;
   determining a tapered speed limit corresponding to the current road based on the speed limit information, wherein the tapered speed limit indicates a gradual speed reduction starting at a first road speed limit and decreasing to a second road speed limit;
   determining a cost function based on the tapered speed limit and the first and second road speed limits;
   generating a plurality of trajectory candidates based on the cost function; and
   selecting a trajectory based on the trajectory candidates to control the ADV using the selected trajectory, wherein the selected trajectory gradually reduces a speed of the ADV from the first road speed limit to the second road speed limit.

9. The non-transitory machine-readable medium of claim 8, wherein the tapered speed limit is generated in response to determining that the current road of the ADV has an impending reduction in road speed limits.

10. The non-transitory machine-readable medium of claim 8, wherein the ADV has a speed planning time window smaller than a time window required for the ADV to slow down from the first road speed limit to the second road speed limit without applying a brake control.

11. The non-transitory machine-readable medium of claim 8, wherein a cost of the cost function is set to a maximum cost for a trajectory candidate having a planned speed greater than a road speed limit for a corresponding section of the current road.

12. The non-transitory machine-readable medium of claim 8, wherein a cost of the cost function is set to a zero cost for a trajectory candidate having a planned speed less than the tapered speed limit.

13. The non-transitory machine-readable medium of claim 8, wherein a cost of the cost function is set to a value proportional to a difference of the planned speed and the tapered speed limit for a trajectory candidate having a planned speed between the tapered speed limit and the road speed limit for a corresponding section of the current road.

14. The non-transitory machine-readable medium of claim 8, wherein the cost function is selected from the group consisting of a jerk, an acceleration, a speed, a distance, and one or more speed limit costs.

15. A computer-implemented method, comprising:
   determining a reference speed curve to gradually slow down an autonomous driving vehicle (ADV);
   for each section of a plurality of road sections in speed limit information for an ADV,
      determining a reduction in speed limit for the road section from a first road speed limit to a second road speed limit;

generating a tapered speed limit for the road section from the first road speed limit and gradually decreasing to the second road speed limit based on the reference speed curve; and storing the tapered speed limit for the road section in the speed limit information, wherein the tapered speed limit is used by the ADV to generate driving trajectory candidates.

16. The computer-implemented method of claim 15, wherein the reference speed curve corresponds to a speed curve to slow down an ADV with a throttle and a brake control of the ADV released while maintaining a same steering for the ADV.

17. The computer-implemented method of claim 15, wherein the tapered speed limit is generated by truncating the reference speed curve starting at a speed corresponding to the first road speed limit and ending at a speed corresponding to the second road speed limit.

18. The computer-implemented method of claim 15, wherein the tapered speed limit indicates a plurality of speed limits at a plurality of points along the road section.

19. The computer-implemented method of claim 15, wherein the tapered speed limit is used to generate a plurality of trajectory candidates based on a cost function.

20. The computer-implemented method of claim 19, wherein one of the plurality of trajectory candidates is selected as a trajectory having a lowest cost to control the ADV based on the selected trajectory.

* * * * *